Sept. 15, 1925.
G. N. SIMPSON
CAR DUMPER
Filed Dec. 22, 1924 4 Sheets-Sheet 3
1,553,882
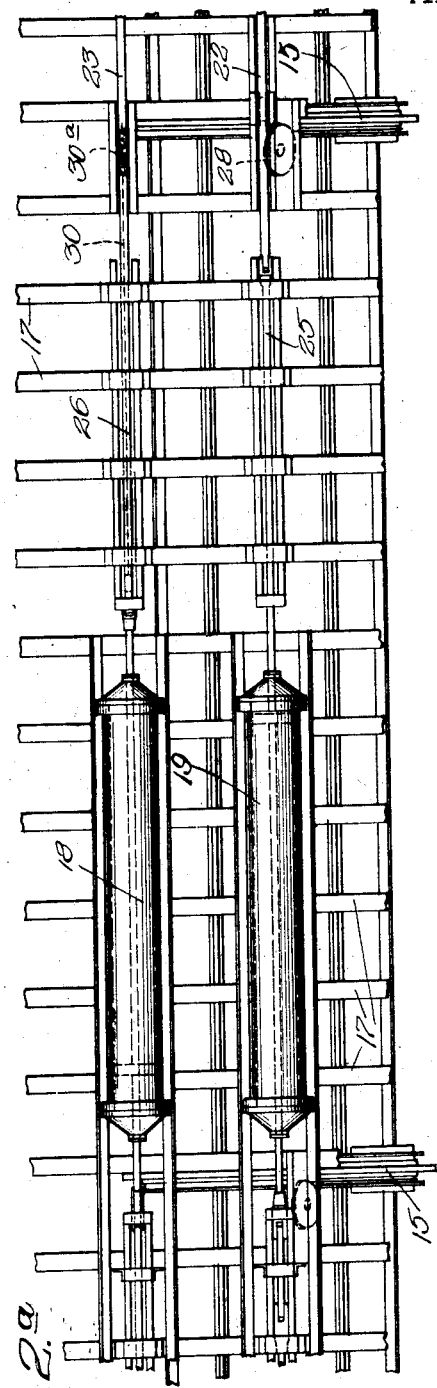
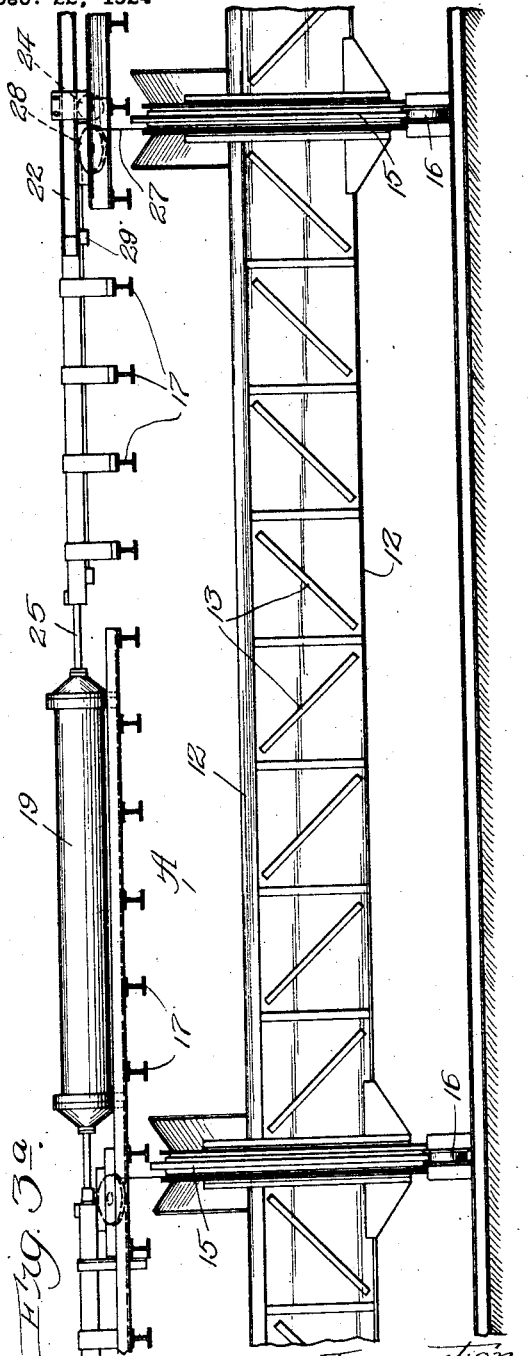
Inventor:
George N. Simpson, Sept. 15, 1925.
G. N. SIMPSON
CAR DUMPER
Filed Dec. 22, 1924
1,553,882
4 Sheets-Sheet 4
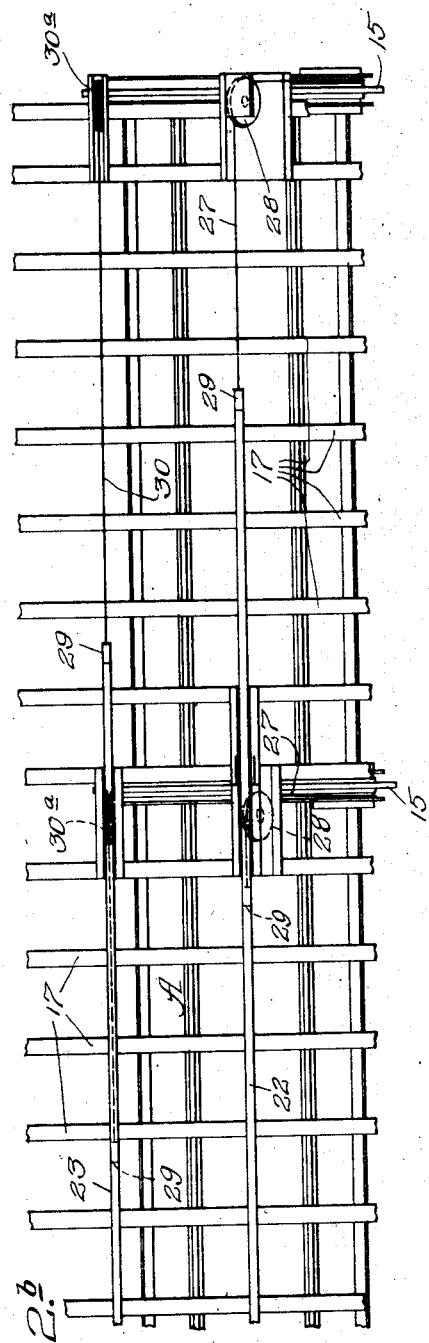
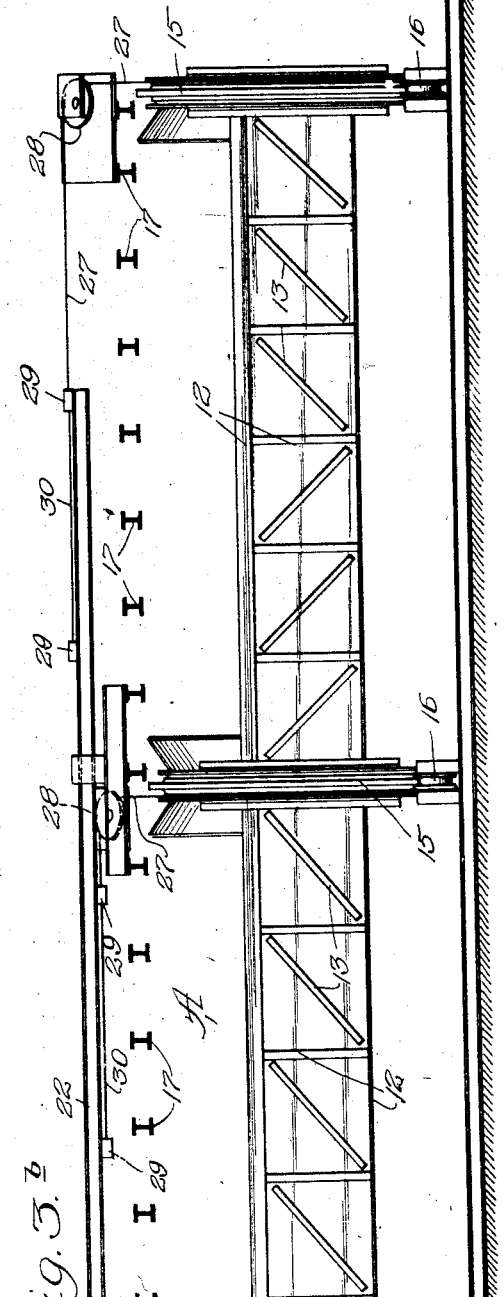

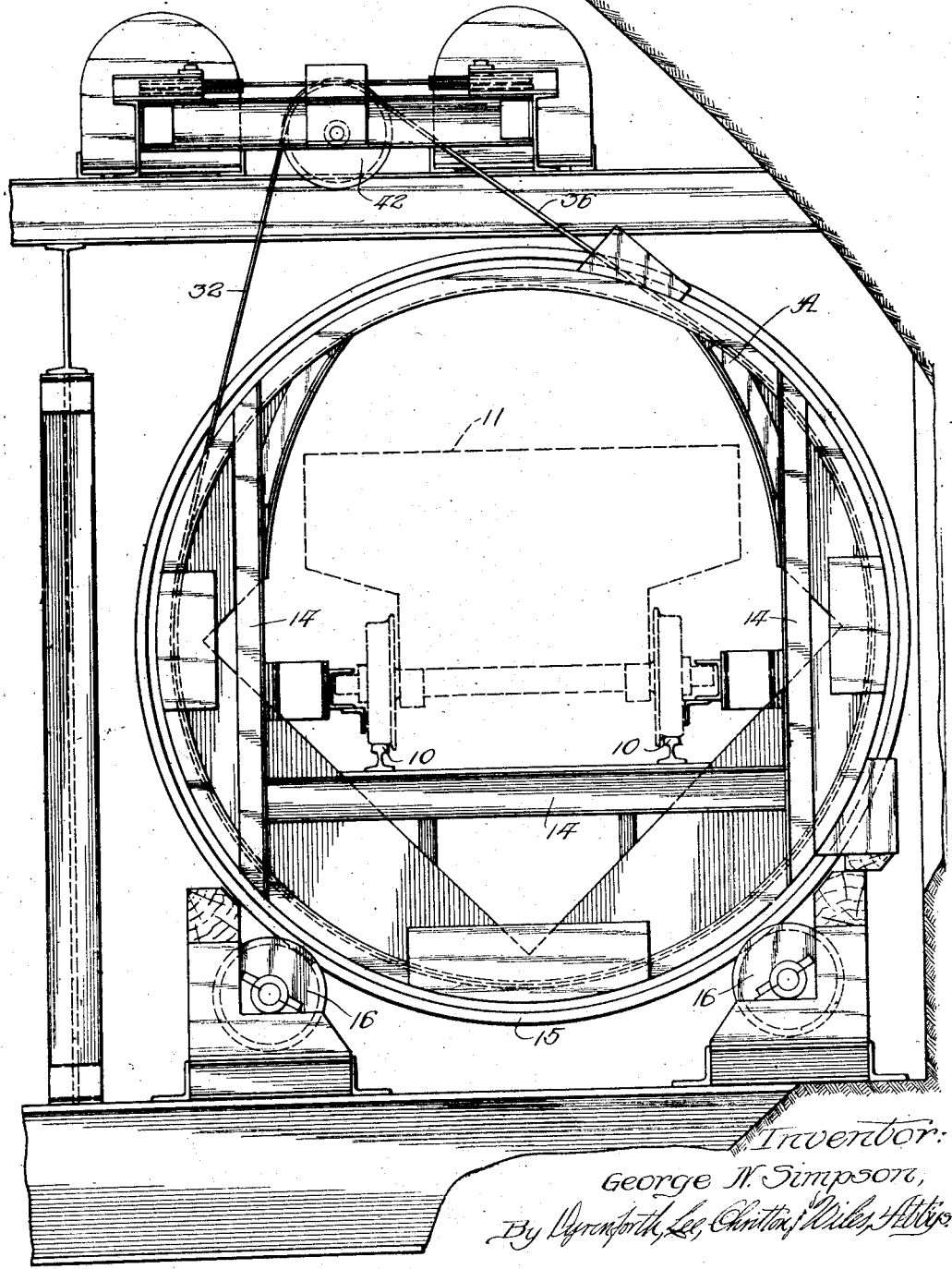

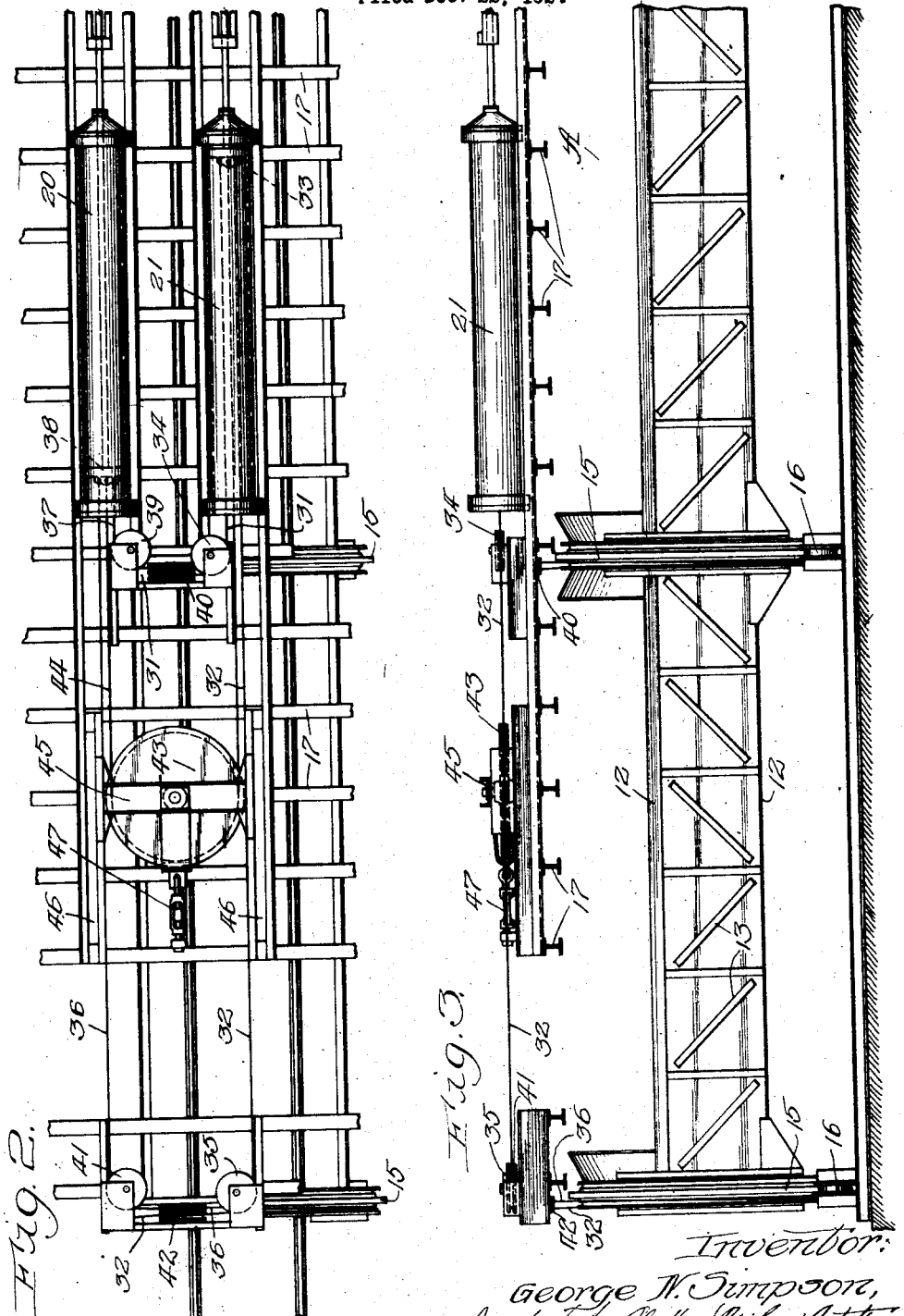

Patented Sept. 15, 1925.

1,553,882

UNITED STATES PATENT OFFICE.

GEORGE N. SIMPSON, OF CHICAGO, ILLINOIS.

CAR DUMPER.

Application filed December 22, 1924. Serial No. 757,427.

*To all whom it may concern:*

Be it known that I, GEORGE N. SIMPSON, a citizen of the United States, residing at Chicago, in the county of Cook and State of Illinois, have invented a new and useful Improvement in Car Dumpers, of which the following is a specification.

This invention relates to improvements in car dumpers and is here shown as embodied in a multiple car dumper adapted for handling a plurality of cars. In fact, the features of my invention are particularly applicable to a car dumper of this type.

The invention also relates to that kind of car dumper comprising a rotatable cylindrical cage in which the cars to be dumped are suitably supported while the cage is rotated thus overturning the cars and dumping the contents.

In a multiple car dumper of this kind, especially when the cage is made with any considerable length for the purpose of accommodating a relatively large number of cars at one operation, difficulty has been experienced in connection with the rotating mechanism in order to cause the different parts of the cage to rotate at the same speed. With the use of long pieces of flexible rope, frequently unequal stretching occurred causing unequal strains to be put on different parts of the apparatus with the result that perfect operation was not obtained. By the use of my invention, these objections are overcome.

By the use of my invention, there is also provided means for taking the strains caused by the rotating mechanism so that such strains are not transmitted to the cage in any manner except to cause rotation of the same.
Other features and advantages of my invention will appear more fully as I proceed with my specification.

In that form of device embodying the features of my invention shown in the accompanying drawings, Fig. 1 is a view in end elevation of a car dumper, Fig. 2—2ª—2ᵇ is a view of the same in top plan, and Fig. 3—3ª—3ᵇ is a view of the same in side elevation.

As shown in the drawings, A indicates, in general, a rotatable cage provided with a track section 10 suitably mounted therein upon which a plurality of cars 11 are adapted to be run. The cage A is suitably strengthened and supported, as for example, by the longitudinal beams 12, 12 and the cross pieces 14, 14 and the struts and braces 13, 13, in any suitable manner in order to form a substantially rigid rectangular cage. The cage is provided at intervals with the ring rails 15, 15 each mounted on a pair of supporting rollers 16, 16 so that the entire cage can be rotated. The length of the entire cage A may be made as desired, in order to accommodate as many cars at once as it is intended shall be handled at one operation. The spacing of the ring rails 15 also may be made as desired, and as many of these ring rails may be used as is deemed necessary to give the proper support to the cage considering its length and the number and weight of the cars to be contained therein. In practice, a car dumper of the type here illustrated has actually been made and used adapted to contain thirty-five mine cars at one operation.

I will now describe the details of the mechanism for rotating the cage as it is in these features that my invention lies. The power means for rotating the cage is preferably mounted above the cage on any suitable support such as the I beams 17, 17. The power means may be any form desired and is here shown as comprising a plurality of hydraulic cylinders provided with pistons therein. It is obvious, however, that any other kind of power means such as a motor or engine may be used. Since the particular construction of the power means forms no part of my present invention, I have not described or shown these hydraulic cylinders in detail. It is to be understood, however, that suitable means, of a well known sort, are provided for admitting fluid under pressure into the cylinders to move the pistons as desired. Although I have here shown four such cylinders, as indicated by 18, 19, 20 and 21 respectively, it is to be understood that there might be fewer or more of these cylinders than the number shown. As here shown, cylinders 18 and 20 operate in tandem and likewise cylinders 19 and 21 operate in tandem. As shown in the drawings, cylinders 18 and 19 are double acting, whereas cylinders 20 and 21 are single acting, but as stated before, the details of construction of the power cylinders form no part of the present invention and may be varied as desired. Likewise, any other suitable power means may be used in place of the hydraulic cylinders.

In the preferred embodiment of the invention, the power means such as the hydraulic cylinders shown, is mounted near one end of the car dumper. As shown in the drawings, it is near the left hand end as viewed in Figs. 2 and 3. In speaking of Fig. 2, I mean Figs. 2, 2ª and 2ᵇ taken together, and likewise in speaking of Fig. 3, I refer to Fig. 3, together with Figs. 3ª and 3ᵇ. It is to be understood, however, that between Figs. 2ª and 2ᵇ the cage may be any length desired. In other words, to the right of the hydraulic cylinders, the cage may be as long as desired and as many ring rails may be provided as necessary to give the proper support to the cage. In order to keep the different parts of the cage rotating at the same speed, I provide two heavy I beams 22 and 23 extending from the power cylinders to the right substantially the entire length of the cage. These I beams are mounted on supporting rollers 24 as shown so that they are adapted to slide lengthwise. The left hand end of the beam 22 is attached to the piston rod 25 of the cylinder 19 and the beam 23 is likewise attached to the piston rod 26 of the cylinder 18. On each side of each of the ring rails 15 there is a groove adapted to accommodate one of the ropes used for rotating the cage. The ropes lying in these grooves are fastened to the long I beams 22 and 23 at different connecting points at the different ring rails. The I beams are very rigid structures and will not stretch. The only ropes used are from the cage to the I beams making very short sections with very little stretching thereof. The ropes used to rotate the cage in one direction are fastened to the I beam 22 and are indicated by the reference numerals 27, 27. Each of these ropes passes over a sheave 28 and is joined to the I beam 22 as indicated at 29. Likewise, each of the ropes for rotating the cage in the opposite direction, as indicated by 30, is joined to the I beam 23 as indicated at 31. It is to be understood that the I beams 22 and 23 shall be long enough to reach from the operating cylinders substantially to the end of the cage and that there may be as many ring rails as desired depending upon the length of cage, with as many pairs of ropes at each ring rail, one rope of each pair being joined to the I beam 22 and the other rope of each pair being joined to the I beam 23. It will be seen that by this construction, sliding of the I beam 22 to the left will pull all the ropes 27 to rotate the cage in one direction and sliding of the I beam 23 to the left will pull all the ropes 30 to rotate the cage in opposite direction. The piston rod projecting from the left hand end of the cylinder 18 is suitably joined to the piston rod projecting from the right hand end of the cylinder 20, and likewise the piston rod from the left hand end of the cylinder 19 is joined to the piston rod projecting from the right hand end of the cylinder 21. In other words, the cylinders 18 and 20 operate in tandem and likewise the cylinders 19 and 21.

As here shown, the power means comprising the hydraulic cylinders is not situated at the extreme left hand end of the cage, but the cage projects some distance beyond to the left. It will be seen that two ring rails 15 lie to the left of the hydraulic cylinders. Each of these ring rails also has on each side of it a groove adapted to accommodate an operating rope. Two of these ropes as indicated by 31 and 32 are fastened to the piston 33 in cylinder 21. The rope 31 passes over the sheave 34, thence over the double-sheave 40, and down around the groove on the far side of the cage (as viewed in Fig. 3). The rope 32 passes around the sheave 35, thence over the double-sheave 42, and likewise down around the far side of the cage. The ropes 36 and 37 are joined to the piston 38 in the cylinder 20. The rope 37 passes over the sheave 39, thence over the double-sheave 40 and then in the groove on the near side of the cage. Likewise the rope 36 passes over the sheave 41, thence over the double-sheave 42 and down around the groove next to the end ring rail on the near side of the cage. Power is applied to the cylinders to move the pistons in the cylinders 18 and 20 in one direction while the pistons in the cylinders 19 and 21 are moved in the opposite direction. It will be seen that by means of the connection of the ropes, the power means may thus be operated to rotate the cage in one direction or the other.

With the construction as shown, it will be seen that tension on the various ropes and pulling of the same will produce a lifting strain on the cage if the ropes are made sufficiently tight in order to operate properly.

I have provided means for taking this tension of the ropes without causing too much of such lifting strain on the cage. Such means comprises a large sheave 43 slidably mounted near the left hand end of the cage having a rope 44 passing over it with its ends tied to the pistons 38 and 33. The sheave 43 is mounted on a cross head 45 slidably mounted in the guides 46 and a turn buckle 47 is provided in order to adjust the position of the sheave 43. It will be seen that by moving the sheave 43 to the left, tension may be put on the rope 44 in order to counterbalance the tension on the various ropes 27 and 30 and thus counteract any tendency of these ropes 27 and 30 to lift the ring rails 15 at the left hand end of the cage off of the supporting rollers 16. As stated before, the cage to the right of the operating cylinders is considerably longer than to the left and consequently the weight of the various ring rails to the right of these cylinders would cause such a tension on the ropes 27 and 30 that the left hand end of the cage would be in danger of being lifted from the supporting rollers if such a sheave 43 were not provided to take the tension. There being more ropes to the right of the operating cylinders, the strain produced by these ropes could not be balanced by the smaller number of ropes to the left of said cylinders, there being only two ring rails, as shown, to the left of the power cylinders.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a device of the character described; a rotatable cylindrical cage adapted to hold a plurality of cars to be dumped; a rigid beam slidably mounted and lying parallel with said cage; a plurality of relatively short ropes wound about said cage at different places throughout its length and attached to said beam at different points, said ropes being led over sheaves whereby sliding movement of said beam causes a pull on all of said ropes to rotate said cage; and power means for sliding said beam.

2. In a device of the character described; a rotatable cylindrical cage adapted to hold a plurality of cars to be dumped; a pair of rigid beams slidably mounted and lying parallel to said cage; a plurality of relatively short ropes wound about said cage in one direction at different places throughout its length and attached to one of said beams at different points, said ropes being led over sheaves whereby sliding movement of said beam will cause a pull on said ropes to cause rotation of said cage in one direction; a plurality of similar relatively short ropes wound about said cage in the opposite direction and similarly attached to said other beam whereby sliding movement of said other beam will cause rotation of said cage in the opposite direction; and power means for reciprocating said beams oppositely to each other.

3. In a device of the character described; a rotatable cylindrical cage adapted to hold a plurality of cars to be dumped; a pair of rigid beams slidably mounted and lying parallel to said cage; a plurality of relatively short ropes wound about said cage in one direction at different places throughout its length and attached to one of said beams at different points, said ropes being led over sheaves whereby sliding movement of said beam will cause a pull on said ropes to cause rotation of said cage in one direction; a plurality of similar relatively short ropes wound about said cage in the opposite direction and similarly attached to said other beam whereby sliding movement of said other beam will cause rotation of said cage in the opposite direction; power means at one end of said beams for reciprocating the same oppositely to each other; and a flexible connection between said beams at the end where said power means is located, said flexible means passing over a sheave.

4. In a device of the character described; a rotatable cylindrical cage adapted to hold a plurality of cars to be dumped; a pair of rigid beams slidably mounted and lying parallel to said cage; a plurality of relatively short ropes wound about said cage in one direction at different places throughout its length and attached to one of said beams at different points, said ropes being led over sheaves whereby sliding movement of said beam will cause a pull on said ropes to cause rotation of said cage in one direction; a plurality of similar relatively short ropes wound about said cage in the opposite direction and similarly attached to said other beam whereby sliding movement of said other beam will cause rotation of said cage in the opposite direction; power means at one end of said beams for reciprocating the same oppositely to each other; and a flexible connection between said beams at the end where said power means is located, said flexible means passing over an adjustably mounted sheave.

5. In a device of the character described: a rotatable cylindrical cage adapted to hold a plurality of cars to be dumped; a pair of rigid beams slidably mounted and lying parallel to said cage; a plurality of relatively short ropes wound about said cage in one direction in different places throughout its length and attached to one of said beams; a plurality of similar ropes similarly wound about said cage in the opposite direction and attached to the other of said beams; and power means for reciprocating said beams oppositely to each other.

6. In a device of the character described; a rotatable cylindrical cage adapted to hold a plurality of cars to be dumped; a pair of rigid beams slidably mounted and lying parallel to said cage; a plurality of relatively short ropes wound about said cage in one direction in different places throughout its length and attached to one of said beams; a plurality of similar ropes similarly wound about said cage in the opposite direction and attached to the other of said beams; power means for reciprocating said beams oppositely to each other; and a flexible connection between said beams at one end thereof, said flexible connection passing over a sheave.

7. In a device of the character described; a rotatable cylindrical cage adapted to hold a plurality of cars to be dumped; a pair of rigid beams slidably mounted and lying parallel to said cage; a plurality of relatively short ropes wound about said cage in one direction in different places throughout its length and attached to one of said beams; a plurality of similar ropes similarly wound about said cage in the opposite direction and attached to the other of said beams; power means for reciprocating said beams oppositely to each other; and a flexible connection between said beams at one end thereof, said flexible connection passing over an adjustably mounted sheave.

8. In a device of the character described; a rotatable cylindrical cage adapted to hold a plurality of cars to be dumped; a pair of rigid beams slidably mounted and lying parallel to said cage; a plurality of relatively short ropes wound about said cage in one direction in different places throughout its length and attached to one of said beams; a plurality of similar ropes similarly wound about said cage in the opposite direction and attached to the other of said beams; power means attached to said beams at one end thereof for reciprocating the same oppositely to each other; a rope attached to said power means and wound about the adjacent end of said cage in one direction; and another rope attached to said power means and wound about the adjacent end of said cage in the opposite direction.

Witness my hand and seal this 29th day of November, A. D. 1924.

GEORGE N. SIMPSON. [L. S.]